June 4, 1963 R. T. BAYNE 3,092,786
D.C. TO A.C. CONVERTER
Filed Sept. 6, 1960
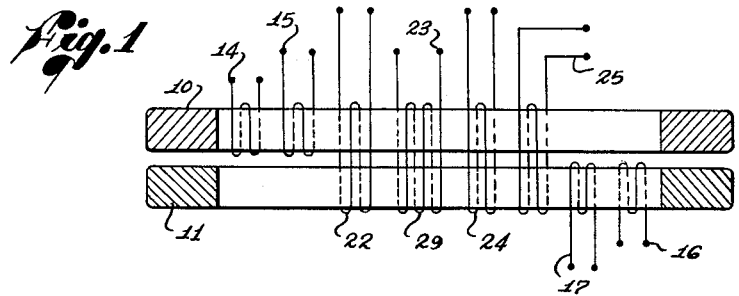
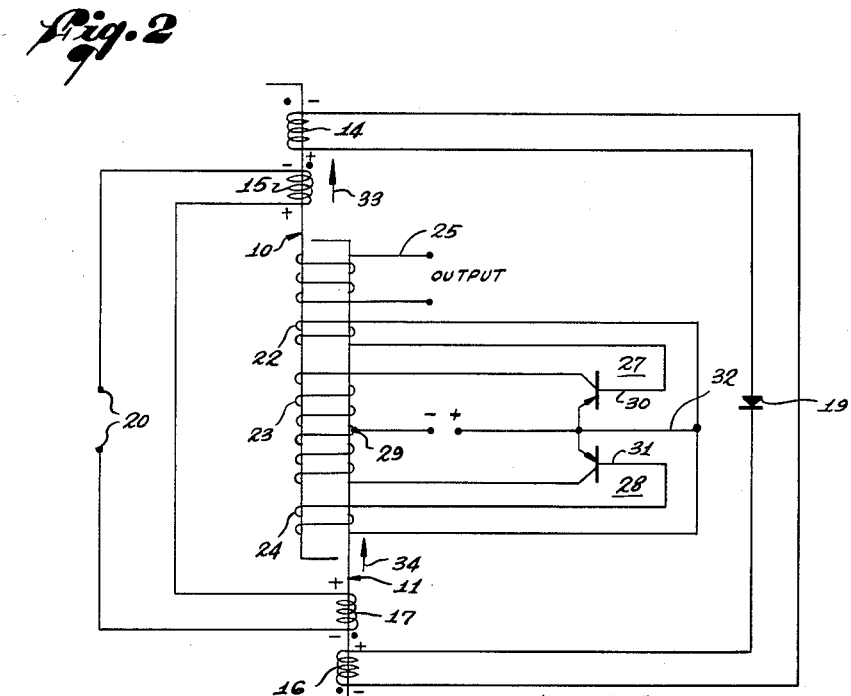
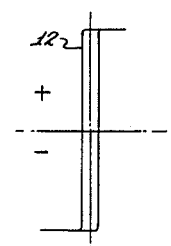
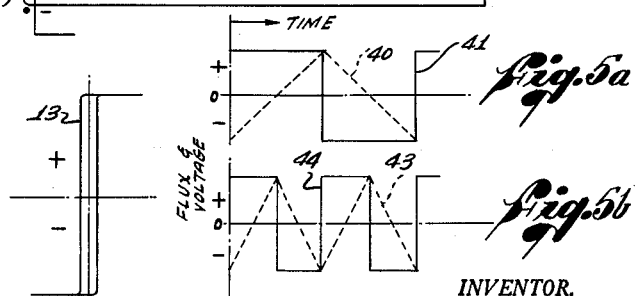
INVENTOR.
ROBERT T. BAYNE
BY Fulwider Mattingly & Huntley
Attorneys United States Patent Office 3,092,786
Patented June 4, 1963

3,092,786
D.C. TO A.C. CONVERTER
Robert T. Bayne, Santa Barbara, Calif., assignor, by mesne assignments, to Varo Inc Electrokinetics Div., Santa Barbara, Calif., a corporation of California
Filed Sept. 6, 1960, Ser. No. 54,308
5 Claims. (Cl. 331—113)

This invention relates to electronic converters, and more particularly to a unique magnetic circuit for developing a signal wherein the frequency corresponds to the magnitude of an input signal.

In many situations, it is highly desirable to be able to convey or transmit signal information by way of frequency modulation. Such frequency modulation is preferred because it is relatively insensitive to interference signals, which are characterized as amplitude modulation noise. Such noise, being variable in the same manner as amplitude modulated carrier signals, directly affects the amplitude variations of such signals. Particular difficulties are encountered in the transmission of amplitude modulated signals along long lines that are subject to high interference. Unfortunately, the signals received at the output end of such long lines vary markedly in their amplitude variations from the amplitude variations of the input signals.

It is an object of my invention to provide a unique D.C. to A.C. converter circuit which develops an A.C. output wherein the frequency corresponds to the magnitude of the input signal and which overcomes the above and other disadvantages of the prior art.

It is another object of my invention to provide a unique magnetic circuit that functions as a D.C. to A.C. converter, and in which the signal source has no effect on the output signal.

A further object of my invention is to provide a D.C. to A.C. converter wherein the output signal is a constant amplitude signal for all magnitudes of an input signal, and in which the output signal variations are of a frequency corresponding precisely to the magnitude of the input signal.

Yet a further object of my invention is to provide a unique D.C. to A.C. converter network comprising a minimum number of component parts of simple design and rugged construction, and which is characterized by high accuracy and reliability.

The above and other objects and advantages of my invention will become apparent from the following description taken in conjunction with the accompanying drawing of an illustrative embodiment thereof, in which:

FIGURE 1 is a sectional view of a pair of juxtaposed toroidal cores, showing schematically the arrangement of certain windings about both cores and respective other windings wound about each of the cores individually;

FIGURE 2 is a schematic diagram of the core and winding construction shown in FIGURE 1, showing how certain windings are interconnected;

FIGURES 3 and 4 are plots of the hysteresis loops for the two cores of FIGURE 1; and FIGURES 5a and 5b are plots of flux and voltage with time for different input signals showing how the frequency of flux changes is reflected in an output voltage frequency that corresponds to the magnitude of the input signal.

Referring to FIGURES 1 and 2, there is shown a pair of stacked toroidal cores 10, 11. The cores 10, 11 are preferably matched in size and magnetic characteristics and also characterized by substantially rectangular hysteresis loops, such as is exhibited by magnetic materials of the type commercially known as Hi-Mu 80. FIGURES 3 and 4 illustrate the hysteresis loops 12, 13 of the cores 10, 11.

The cores 10, 11 are provided with respective pairs of coils 14, 15 and 16, 17. The coils 14, 16 are connected in series, with a unidirectionally conductive device, shown as a diode 19, connected between the coils 14, 16. The coils 15, 17 are connected in series between signal input terminals 20, across which a D.-C. signal source is connected. As will be apparent, the D.-C. source may be of any suitable type, such as a transducer for developing D.-C. voltages corresponding to a desired measurable parameter. Other coils 22, 23, 24 and 25 have their turns passing around both the cores 10, 11.

The coils 22-24 are arranged to establish an oscillating magnetic field. To this end, the emitter-collector current paths of respective transistors 27, 28 are connected between the ends of the coil 23 and the positive terminal of a D.-C. source. The negative terminal of the source is connected to the center tap 29 of the coil 23. The coils 22, 24 are connected to the base electrodes 30, 31 of the transistors 27, 28, and, as at 32 to the common emitter junction of the transistors.

My unique circuit functions to control the frequency of operation of the oscillator, and hence the frequency of reversal of the flux fields in the cores 10, 11, so as to correspond to the magnitude of the input signal at the terminals 20. For this purpose, the coils 14, 16 are poled, as indicated, so that currents therethrough (due to changing flux in the cores 10, 11) are in opposite directions. Thus, when the flux is in one direction, the lower end of the coil 14 and the upper end of the coil 16 are positive, and such ends are negative when the flux is in the opposite direction. Considering the first-mentioned relationship, it will be seen that if the induced voltages in the coils 14, 16 are equal, then they are equal and opposite in the circuit in which they are employed. Hence, no current flows in such circuit.

The coils 15, 17 are poled similarly as the coils 14, 16. However, the current from the D.C. signal source prevents the voltages induced in the coils 15, 17 from being equal and opposite. To understand why this is so, let it be assumed that the oscillator is operating to establish a magnetic field in the cores 10, 11 in a direction indicated by the respective arrows 33, 34. With the coils 15, 17 poled as indicated, current through the coil 15 is in a direction to oppose the flux, and current through the coil 17 is in a direction to aid the flux. This means that a greater voltage is established across the coil 17 than across the coil 15.

By aiding the flux in the core 11 and opposing the flux in the core 10 in the manner described, the core 11 operates as if ampere-turns were added thereto, and the core 10 operates as though ampere-turns were subtracted therefrom. This results in the core 11 being placed closer to saturation on its hysteresis curve 13, and the core 10 being positioned farther from saturation on its hysteresis curve 12.

Immediately upon the core 11 saturating, the induced voltages across the coils 16 and 17 drop to zero. The removal of voltage from across the coil 16 has two effects. One effect is that of placing a short-circuit across the coil 14. The other is that the oscillator is suddenly working with half the core area, i.e., only the area of the core 10. Accordingly, the magnetization of the core 10 proceeds along its hysteresis curve 12 at a greater rate. This event results in a still greater current being induced in the coil 14.

As the core 10 approaches near saturation, the current in the short-circuited coil 14 causes the coil 14 to overload the oscillator. The oscillator is the type that quits when the core is loaded too heavily, i.e., when there is too much loss to maintain regeneration. However, the oscillator is a bistable device, and immediately upon being overloaded while magnetizing a core in one direction, reverses operation to start building up flux in the other direction. Simultaneously the short-circuit across the coil 14 is removed.

When the flux changes direction in the cores 10, 11 as above-described, the core 10 saturates first, followed almost immediately by saturation of the core 11 to effect reversal of the oscillator output current.

The frequency at which the reversals of flux occur will be seen to be determined by the magnitude of the input signal voltage. FIGURE 5a, for example, illustrates the situation for a D.-C. input of one magnitude, showing the build-up and reversal of flux at 40. The voltage 41 across the output winding 25 is a constant positive value while flux increases in one direction, and a constant negative value while the flux increases in the opposite direction.

As will be seen, the total flux is fixed at a value depending upon the flux density and the core area. And such total flux is reached faster when the input signal increases. Thus, FIGURE 5b shows the results of a signal of double the magnitude of that which created the square wave 41 of FIGURE 5a. The points of maximum flux, i.e., saturation of both coils or saturation of one coil and overload of the other, occur in half the time required for the input signal of half magnitude, as indicated at 43. The resultant square wave 44 is double the frequency of the square wave 41.

As will be apparent, the oscillator of my unique converter is not affected by the resistance or impedance of the signal source. This is because, although the signal source is coupled to the oscillator, the oscillator is not coupled to the signal source. Accordingly, the frequency of operation of the oscillator, and hence the frequency of the voltage induced in the output coil 25, truly represents the magnitude of the input signal.

While I have described a particular embodiment of my invention, it will be apparent that various modifications can be made without departing from the spirit and scope of my invention. Accordingly, I do not intend that my invention be limited except as by the appended claims.

I claim:

1. A converter comprising: magnetic circuits formed of a pair of cores of magnetic material, said material being characterized by a substantially rectangular hysteresis loop; respective inductive means linking the magnetic circuits; means cooperatively related to both magnetic circuits to cyclically vary the direction of flux therein; a first pair of coils linking the respective cores connected in series; a second pair of coils linking the respective cores connected in series; a source of D.-C. voltage coupled in series with said first pair of coils; a unidirectional current device coupled in series with said second pair of coils; and an output coil linking the magnetic circuits.

2. A converter comprising: a pair of toroidal cores; first, second and third coils each linking both of said cores; an output coil linking said cores; means interconnecting said first and second coils with respective halves of said third coil for cyclically varying the direction of flux in said cores, said means including a pair of transistors having their emitter-collector current paths coupled to the ends of said third coil; a D.-C. supply source connected to both emitter-collector current paths and to a center-tap on said third coil; means connecting said first and second coils in series with the base circuits of said transistors; a first pair of coils linking the respective cores connected in series; a second pair of coils linking the respective cores connected in series; a D.-C. signal source connected in series with said first pair of coils; and a unidirectional current device connected in series with said second pair of coils.

3. A variable frequency D.C. to A.C. converter including in combination:
a magnetic multivibrator comprising two amplifier units and first and second cores of magnetic material, with the multivibrator windings looping both cores;
an output winding looping both cores;
an input circuit comprising a first winding on the first core and a second winding on the second core, with the first and second windings connected in series across the D.C. input source;
and a control circuit comprising a third winding on the first core and a fourth winding on the second core, with the third and fourth windings connected in series across a unidirectional current device.

4. A variable frequency D.C. to A.C. converter including in combination:
a magnetic multivibrator comprising two amplifier units and first and second cores of magnetic material of high squareness ratio, with the multivibrator windings looping both cores;
an output winding looping both cores;
an input circuit comprising a first winding on the first core and a second winding on the second core, with the first and second windings connected in series across the D.C. input source;
and a control circuit comprising a third winding on the first core and a fourth winding on the second core, with the third and fourth windings connected in series across a unidirectional current device, and with the first and third windings having the same polarity and the second and fourth windings having the same polarity.

5. A variable frequency D.C. to A.C. converter including in combination:
a magnetic multivibrator comprising two transistors and first and second substantially identical closed cores of magnetic material with substantially rectangular hysteresis loop, with the multivibrator windings looping both cores;
an output winding looping both cores;
an input circuit comprising a first winding on the first core and a second winding on the second core, with the first and second windings connected in series across the D.C. input source;
and a control unit comprising a third winding on the first core and a fourth winding on the second core, with the third and fourth windings connected in series across a diode, and with the first and third windings having the same polarity and the second and fourth windings having the same polarity.

References Cited in the file of this patent

UNITED STATES PATENTS

| | | |
|---|---|---|
| 2,774,878 | Jensen | Dec. 18, 1956 |
| 2,849,615 | Gustafson | Aug. 26, 1958 |
| 2,862,171 | Freeborn | Nov. 25, 1958 |
| 2,964,716 | Berman | Dec. 13, 1960 |
| 2,964,717 | Carstedt et al. | Dec. 13, 1960 |

OTHER REFERENCES

Electronics, July 24, 1959, "Frequency Control of Magnetic MV." Pages 54–56.